United States Patent [19]
Harrington

[11] Patent Number: 5,953,464
[45] Date of Patent: *Sep. 14, 1999

[54] INTELLIGENT SCALING OF IMAGES STORED IN LOW-COST IMAGE BUFFERS

[75] Inventor: Steven J. Harrington, Holley, N.Y.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/935,727

[22] Filed: Sep. 23, 1997

Related U.S. Application Data

[60] Continuation of application No. 08/478,583, Jun. 7, 1995, abandoned, which is a division of application No. 08/083,581, Jun. 30, 1993, Pat. No. 5,583,953.

[51] Int. Cl.$^6$ ............................. G06K 9/32; G06K 9/40
[52] U.S. Cl. .................... 382/299; 382/166; 382/262; 382/264; 382/300; 358/525
[58] Field of Search ............................. 382/166, 233, 382/243, 242, 262, 264, 299–301, 268, 266, 267, 239, 164, 305; 358/525, 528, 451, 428; 395/115–117

[56] References Cited

U.S. PATENT DOCUMENTS

| | | |
|---|---|---|
| 4,454,593 | 6/1984 | Fleming et al. .................... 345/428 |
| 4,620,288 | 10/1986 | Welmers .................... 382/296 |
| 4,959,868 | 9/1990 | Tanioka .................... 382/176 |
| 4,986,526 | 1/1991 | Dastin .................... 271/227 |
| 5,001,576 | 3/1991 | Tanaka et al. .................... 358/462 |
| 5,046,119 | 9/1991 | Hoffert et al. .................... 382/166 |
| 5,048,112 | 9/1991 | Alves et al. .................... 382/233 |
| 5,117,294 | 5/1992 | Yano .................... 358/451 |
| 5,204,665 | 4/1993 | Bollman et al. .................... 345/155 |
| 5,258,854 | 11/1993 | Eschbach .................... 358/447 |
| 5,265,176 | 11/1993 | Miller .................... 382/299 |
| 5,276,532 | 1/1994 | Harrington .................... 358/524 |
| 5,293,430 | 3/1994 | Shiau et al. .................... 382/173 |
| 5,341,442 | 8/1994 | Barrett .................... 382/166 |
| 5,347,368 | 9/1994 | Mochizuki .................... 358/296 |
| 5,495,538 | 2/1996 | Fan .................... 382/268 |
| 5,506,693 | 4/1996 | Koshak .................... 358/448 |

*Primary Examiner*—Leo H Boudreau
*Assistant Examiner*—Bhavesh Mehta
*Attorney, Agent, or Firm*—Oliff & Berridge, PLC

[57] ABSTRACT

A method and apparatus for achieving an ultra-small or compressed image buffer images at half the resolution and then scales by two to achieve the device resolution. Acceptable quality can be maintained by identifying edge and interior portions of the page image and using this information to scale intelligently. A split-level frame buffer provides this identification of the image components. Further, an extension of block-truncation coding can be used with the split-level frame buffer to provide up to a 16 to 1 compression for an overall compression of up to 64 to 1. Actual techniques to scale these encodings are described along with new encodings for graphics and text designed this high compression of the image.

42 Claims, 7 Drawing Sheets

| 1 | 1 |
|---|---|
| 1 | 0 |

FIG.4B

| 0 | 0 |
|---|---|
| 0 | 1 |

FIG.4C

| 1 | 0 |
|---|---|
| 1 | 1 |

FIG.4D

| 0 | 1 |
|---|---|
| 0 | 0 |

FIG.5A

| 1 | 1 | 1 | 1 |
|---|---|---|---|
| 1 | 1 | 1 | 1 |
| 1 | 1 | 1 | 0 |
| 1 | 1 | 0 | 0 |

FIG.5B

| 0 | 0 | 0 | 0 |
|---|---|---|---|
| 0 | 0 | 0 | 0 |
| 0 | 0 | 0 | 1 |
| 0 | 0 | 1 | 1 |

FIG.5C

| 1 | 1 | 0 | 0 |
|---|---|---|---|
| 1 | 1 | 1 | 0 |
| 1 | 1 | 1 | 1 |
| 1 | 1 | 1 | 1 |

FIG.5D

| 0 | 0 | 1 | 1 |
|---|---|---|---|
| 0 | 0 | 0 | 1 |
| 0 | 0 | 0 | 0 |
| 0 | 0 | 0 | 0 |

FIG.6

| a | a | b | c |
|---|---|---|---|
| a | a | b | c |
| a | b | c | c |
| b | b | c | c |

FIG.7A — a bitmap

| 1 | 1 | 0 | 0 |
|---|---|---|---|
| 1 | 1 | 0 | 0 |
| 1 | 0 | 0 | 0 |
| 0 | 0 | 0 | 0 |

FIG.7B — b bitmap

| 0 | 0 | 1 | 0 |
|---|---|---|---|
| 0 | 0 | 1 | 0 |
| 0 | 1 | 0 | 0 |
| 1 | 1 | 0 | 0 |

FIG.7C — c bitmap

| 0 | 0 | 0 | 1 |
|---|---|---|---|
| 0 | 0 | 0 | 1 |
| 0 | 0 | 1 | 1 |
| 0 | 0 | 1 | 1 |

| a | b |
|---|---|
| c | d |

FIG.22

INTELLIGENT SCALING OF IMAGES STORED IN LOW-COST IMAGE BUFFERS

This is a Continuation of application Ser. No. 08/478,583 filed Jun. 7, 1995 now abandoned, which in turn is a Division of application Ser. No. 08/083,581, U.S. Pat. No. 5,583,953.

BACKGROUND OF THE INVENTION

The present invention relates to a method and apparatus for reducing the size of an image buffer in a color printer, and more particularly, to intelligent doubling of scaled images, wherein smooth areas of an image are distinguished from edges and are scaled differently. The invention provides scaling methods for the encodings used in the split-level image buffer and further encodings useful for graphics and text.

Modern page description languages describe a page as a sequence of primitive drawing commands. The full page image is constructed by executing these commands and collecting the image elements they produce. Printers form an internal representation of the desired page in a computer memory prior to marking. The memory is called the image buffer and typically contains a color value for every spot or pixel that can be marked. The page can have a large number of pixels (e.g. 90,000 to 360,000 per square inch) and so a great deal of memory is typically required for the image buffer.

U.S. patent application Ser. No. 07/797,876 entitled "Split-Level Frame Buffer" describes a method to reduce the amount of memory required to construct a full color page image for printing. The method encodes the page images using two resolutions, a low resolution for object interiors and a high resolution for object edges. This patent application is herein incorporated by reference. Subsequent inventions provide efficient encodings of the high resolution edge pixels for two-color patterns, edges separating two colors and ordered regions of three colors. Line graphics and scanned pictorial images can be expressed using these encodings resulting in a compression (or reduction of the memory requirements) of up to 16 to 1.

SUMMARY OF THE INVENTION

It is an object of the present invention to improve on the conventional techniques of image encoding, scaling and doubling.

It is a further object of the present invention to provide intelligent doubling for scaled images including multi-color block, curved edge encoding, graphics and to introduce line encoding and text encoding that maintain high quality resolution.

The present invention achieves these and other objects and advantages by providing an improvement of the conventional techniques that can provide an additional compression of 4 to 1 for an overall compression ratio of up to 64 to 1. This can mean a reduction of memory requirements from 60 MBytes for a full color page to less than 1 MByte and can give a substantial cost saving.

The method is to construct the image within a computer at half the required resolution for the marking device, and once the image is complete, to scale it (a few scan lines at a time) to the full size required for marking. A naive scaling of the image would be unacceptable, however, because edges would be too jagged or blurred, but when interior and edge regions have been identified, as in the case of the split-level image buffer, then different scaling methods can be applied to the different regions or encodings resulting in an image of acceptable quality.

More particularly, these objects are achieved by providing a method of doubling an image in a reduced image buffer for printing by a marking device. The method includes the steps of constructing the image at half a required resolution for the marking device; distinguishing smooth areas of the image from edges of the image; scaling the smooth areas by a first scaling technique; and scaling the edges by a second technique, where the second technique is different from the first technique.

In another aspect of the invention, a method of encoding a graphic image at full resolution for storing in a reduced image buffer for subsequent printing by a marking device is provided. The method includes the steps of distinguishing smooth areas of the image from edges of the image; determining a construction of the edges in a block of the image; and storing the construction in the reduced image buffer.

The determining step includes the step of describing an edge for the block by storing positions at which the edge enters and exits the block, and further includes the step of providing a tag and a color table index.

In an alternate aspect of the invention, the determining step includes the step of describing first and second edges for the block by storing positions at which the first edge enters and exits the block and an offset amount to the entry position of the second edge. The determining step can further include the step of providing a tag and a color table index. The determining step also includes the step of defining a corner of the image by storing an entry position of the corner on one side of the block and storing an exit position of the corner rotated 90 degrees so that it lies on the same side. In addition, the defining step can further include the step of describing first and second edges for the corner by storing an offset amount.

In yet another aspect of the invention, a method of encoding text characters at full resolution for storing in a reduced image buffer for subsequent printing by a marking device is provided. The marking device includes a font cache storing bitmaps of the characters. The method includes the steps of providing a pointer for accessing the character bitmaps stored in the font cache; and storing the pointer in the reduced image buffer. In a variant aspect, the method further includes the step of determining whether the characters or a background are colored, and the step of providing color indices indicating the color of the character or background in accordance with the determining step.

In still another aspect of the invention, a method of doubling an image in a reduced image buffer for printing by a marking device is provided. The method includes the steps of dividing the image into the uniform blocks corresponding to the moderate resolution pixels of the split level frame buffer identifying interior and edge regions and distinguishing between region types. The image types include pictorial, graphic and line, and text. Blocks of each region type are encoded differently and stored in the reduced image buffer. Pictorial regions are encoded at half a required resolution for the marking device and scaled in accordance with the determining step.

In another aspect of the invention, a method is provided for encoding and storing a pixel block. The method includes the steps of storing a representation of the block at half resolution values and scaling the block to full resolution values for marking. The block size is 8×8 pixels. In addition, the scaling step further includes the step of filtering, which is performed by calculating the full resolution values as a weighted sum of neighboring half resolution values.

In an alternate aspect of the invention, the block contains two colors, and the scaling step includes the steps of recognizing corner patterns and smoothing the corner patterns at full resolution.

In still another aspect of the invention, the block contains three colors that always occur in the same order in each row or column. The scaling step includes the steps of generating bitmaps for at least two of the three colors and scaling the bitmaps. The bitmap scaling step can include the steps of recognizing corner patterns and smoothing the corner patterns at full resolution.

In yet another aspect of the invention, the block contains an edge between two colors. The scaling step includes the step of using edge placement values to determine which full resolution pixel contains the edge for each of the half resolution rows or columns.

An apparatus is provided for carrying out the above-described methods.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

The following detailed description of preferred embodiments is applicable to numerous image systems and buffers as would be contemplated by those of ordinary skill. A non-limiting example of such a system is described in U.S. Pat. No. 4,986,526, which is hereby incorporated by reference.

The following describes intelligent doubling schemes for some of the encodings of the split-level frame buffer. New encodings are also described for lines and text, which provide smoother lines and optimal characters under the doubling scheme.

Low-resolution Pixel

A low-resolution pixel is a single color value for a 4×4 block of pixels. Simple doubling would replicate color over an 8×8 block. However this area is large enough to give visible "blocky" artifacts when sequences of pixels of varying colors are expanded. To reduce this, the colors of the previously expanded pixels above and left (A, B, C) are examined and those, together with the current pixel color (D), can provide the colors for the four corners of the block (see FIG. 1). One can then linearly interpolate the corner colors to determine color values for the pixels within the block (a technique known as Gouraud shading).

Figure 1:
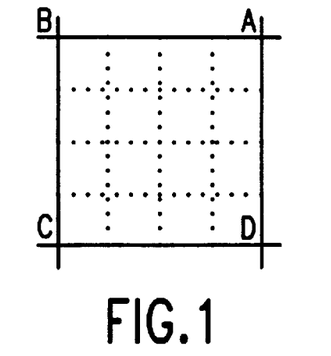
FIG. 1 depicts corner colors for a low resolution pixel.

One further restriction is necessary. The previous colors (A, B, or C) are only used for the block corners provided they are close to the new pixel color D. If any of the previous colors differ from D by more than some tolerance, then color D should be used at that corresponding corner of the block. That is, the greater the difference, the more likely the image includes the sharp contrast in color, and smoothing should not be performed. The tolerance depends on the properties of the human visual system but requirements also vary with the application. Empirical studies suggest that if there is a difference of 32 or more in any of the red, green, or blue color components (where components range between 0 and 255), then the colors should not be interpolated.

Full Half-resolution Block

Figure 2:
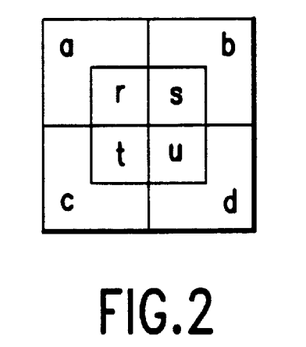
FIG. 2 shows the generation of double resolution from high resolution.

While it is usually possible to reduce a 4×4 block of pixels to one of the 32-bit special encodings, there may be blocks where none of the special cases work well, and where the 16 color values should be saved. To double such a full resolution block, each pixel is reproduced four times; but a smoother effect is produced through filtering with a low-pass filter, an edge-preserving filter or by calculating the expanded pixel color as a weighted average of neighboring unexpanded colors. In FIG. 2, $a, b, c$ and $d$ represent four unexpanded half-resolution pixels, and $r, s, t$ and $u$ represent the expanded values generated by them. This is achieved as follows:

$$r = w_1 a + w_2 b + w_3 c + w_4 d$$

$$s = w_1 b + w_2 d + w_3 a + w_4 c$$

$$t = w_1 c + w_2 a + w_3 d + w_4 b$$

$$u = w_1 d + w_2 c + w_3 b + w_4 a$$

The weights ($w_1, w_2, w_3, w_4$) describe the filter shape and sum to 1 (for example $w_1 = 3/8$, $w_2 = 1/4$, $W_3 = 1/4$, $W_4 = 1/8$).

Two-color Blocks

Figure 3A:
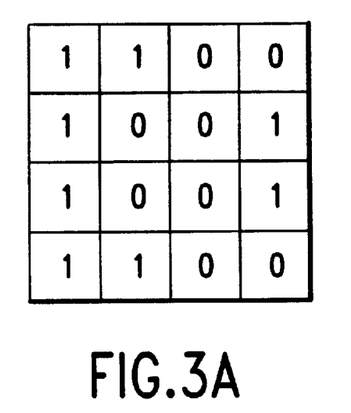
FIGS. 3A–B show a simple replication of a bitmap.
Figure 3B:
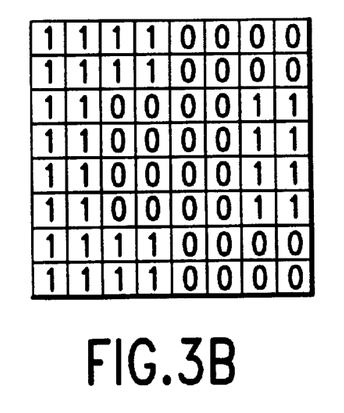
Figure 4A:
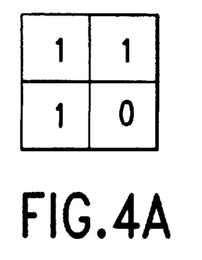
FIGS. 4A–D illustrate corner patterns in two color blocks.
Figure 4B:
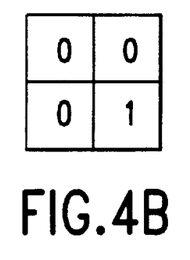
Figure 4C:
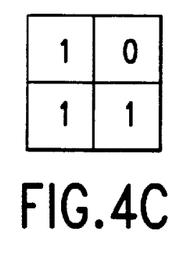
Figure 4D:
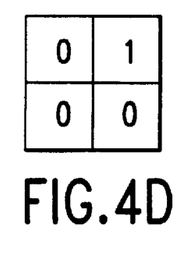
Figure 5A:
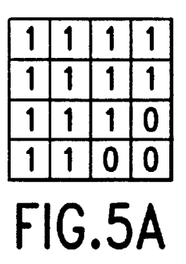
FIGS. 5A–D show the corner patterns of FIG. 4 as smooth corners.
Figure 5B:
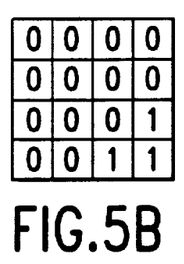
Figure 5C:
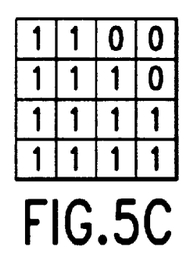
Figure 5D:
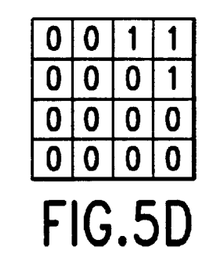

A two-color block has two colors and a bitmap to select between them. The simple scaling approach would be to replicate rows and then columns of the bitmap (FIGS. 3A–B). This, however, leads to jagged edges. The present system recognizes certain corner patterns before expansion (see FIGS. 4A–D) by a known technique and "fills in" or smooths these corners when doubling (see FIGS. 5A–D).

Three-color Blocks

Figure 6:
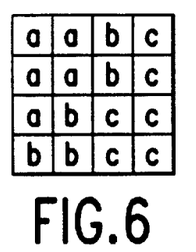
FIG. 6 illustrates a three color block.
Figure 7A:
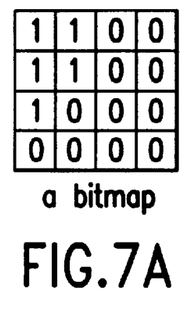
FIGS. 7A–C illustrate bitmaps for a three color block.
Figure 7B:
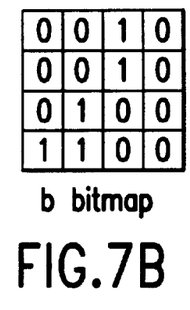
Figure 7C:
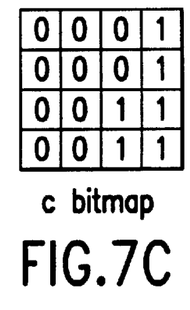

The three-color encoding describes blocks containing three colors that always occur in the same order along a row or column. From the encoding, a bitmap is derived of each of the three colors indicating which pixels receive the color. For example, if the block colors a, b, c occur as known in FIG. 6, then the bitmaps are as shown in FIGS. 7A–C. Actually, only two of the bitmaps are needed since the third can be derived as the complement of their disjunction. Once bitmaps for two of the three colors are derived, they can be expanded just as for the two-color case, yielding a prescription for coloring the three-color block.

Curved-edge Encoding

Figure 8A:
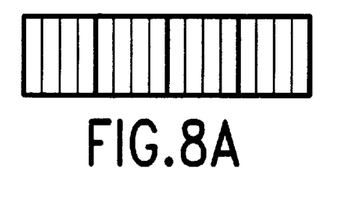
FIGS. 8A–B illustrate the expanding of a row in curved edge encoding.
Figure 8B:
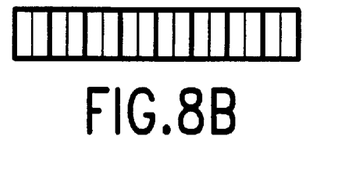
Figure 9A:
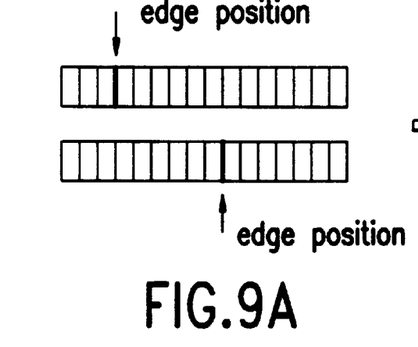
FIGS. 9A–B depict the constructing of a row by interpolation in curved edge encoding.
Figure 9B:
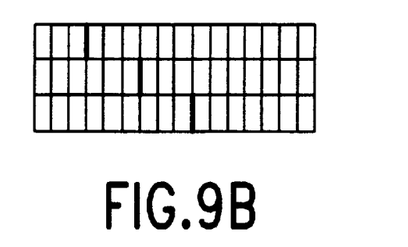

The edge encoding describes the position of an edge between two colors along each row or column. The edge is positioned with sub-pixel precision, and the pixel containing the edge contains a mixture of the two colors weighted by the edge position. Doubling the length of a row or column is done by halving the sub-pixel placement accuracy. For example, with 16 edge positions in a row of four pixels, there would be four possible edge positions within each pixel. Expanding the row to eight pixels, there are 16 edge positions, but only two positions for each pixel (see FIGS. 8A–B). Having doubled the length of a row or column, the system doubles the number of rows or columns. This can be done by interpolating the edge position across two adjacent rows and constructing a new row between them (see FIG. 9).

Smoothing

The two- and three-color encodings require quantization of all the colors within a block to just two or three. This can introduce blockiness, which will be visible when the image is doubled. To reduce this, an additional smoothing or filtering operation is performed on the pixels belonging to blocks of these classes. The color of a pixel is replaced with a weighted average of it and its neighbors. For example, referring to FIG. 10, looking at a four-pixel region a, b, c, d, d can be replaced with d' where $$d'=w_1 a + w_2 b + w_3 c + w_4 d.$$

Figure 10:
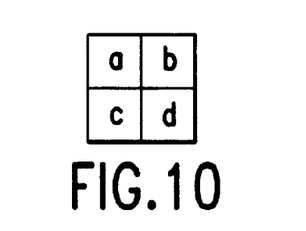
FIG. 10 shows a four pixel region in a smoothing operation.

For a simple average, $w_1=w_2=w_3=w_4=¼$.

One modification can be made to this scheme. The color differences between the pixel being replaced is examined with its neighbors (d to a, d to b, and d to c). If any neighbor differs from the color of the pixel being replaced by more than some threshold, then the value of the neighbor color is replaced with the value of the pixel being replaced for the calculation. For example, if color c differs from color d by more than the threshold, then the value of $w_3 d$ instead of $w_3 c$ is used for the $w_3$ term in the calculation. The same threshold can be used here as is used in the expansion of low-resolution blocks.

Graphics and Line Encoding

Figure 11:
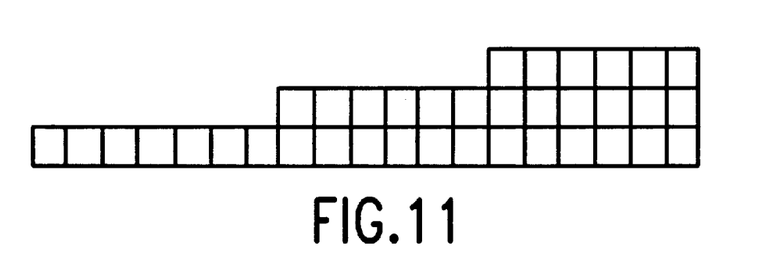
FIG. 11 illustrates steps in a nearly horizontal edge for line encoding.
Figure 12:
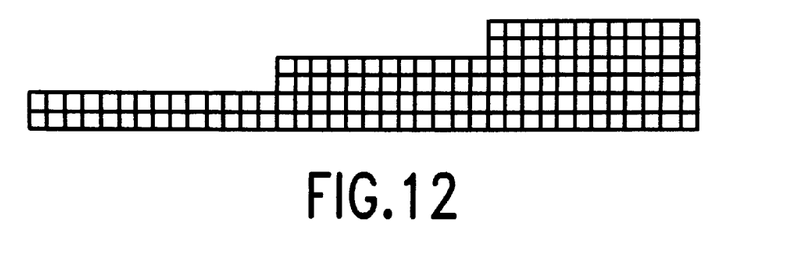
FIG. 12 shows the doubled edge of FIG. 11 having jagged two pixel steps.
Figure 13:
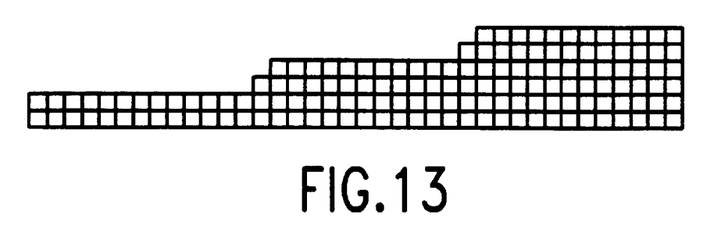
FIG. 13 shows the FIG. 11 steps doubled using two-color smoothing.
Figure 14:
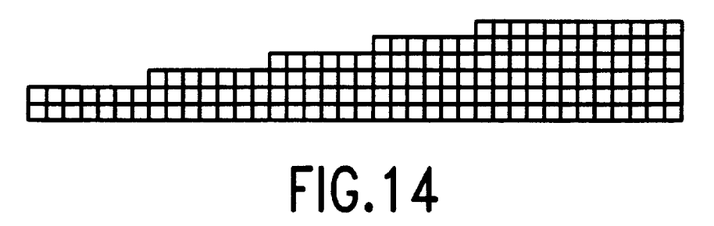
FIG. 14 illustrates the generation of intermediate steps.

The encodings discussed thus far were devised for representing pages without doubling; the doubling techniques were then added as an extension. But knowing that the page resolution will be doubled provides a motivation for devising new encodings. These encodings can improve the quality of line graphics and text. Consider a nearly horizontal or nearly vertical line. These lines have fairly long runs of pixels between steps to new rows or columns (see FIG. 11). Referring to FIG. 12, when naively doubled, these lines will have jagged edges at the steps. The techniques used for the two-color pixels can only round the corners of the steps (FIG. 13). Accordingly, a description of the edge that would allow creation of intermediate steps when decoding is desirable (see FIG. 14).

Figure 15:
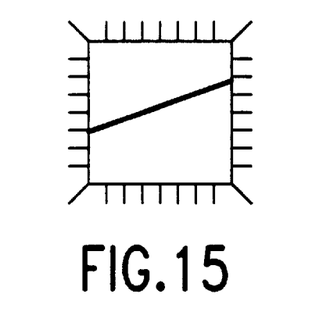
FIG. 15 depicts the operation of defining an edge by entry and exit positions.

This can be done if the edge for a block is described rather than the bit pattern that the edge generates. This is accomplished by storing the positions at which the edge enters and exits the block. For example, each side of the block can be divided into 8 positions (32 positions for all four sides of the block), and the closest position for entry of the edge and the closest for its exit are specified (see FIG. 15). The specification would take 5 bits for each position or 10 bits total. Actually, this can be reduced to 9 bits because of the symmetry of the entry and exit (i.e., 10 bits are only required if the edges are directed). The remaining bits of the block descriptor are then used for a tag and a color table index to describe two colors separated by the edge.

If only 10 bits are needed for the edge, there are 22 bits of a 32-bit word remaining for a tag and color table index. This is more than adequate, and some of those bits can be used to extend the encoding to cover more of the likely cases. Often, the edge will be the side of a line or stroke. If it is a thin line, then both of its sides or edges may be contained within the block. The encoding described above can handle one edge in the block, however, not two. To remedy this, it is assumed that the block contains two parallel edges. The two edges are described by the entry and exit positions of one of the edges along with the offset to the entry position of the second edge. Without loss of generality, the entry position of the second edge is specified as a clockwise offset of steps along the boundary of the block from the entry position of the first edge. The offset is no more than half way around the block, or 16 steps, so only 4 bits are required for the offset. Thus, 14 bits can specify two parallel edges.

Figure 16:
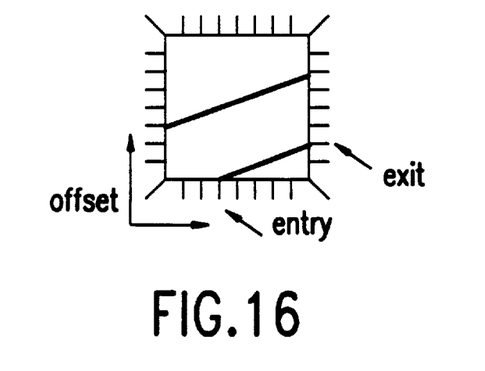
FIG. 16 shows the defining of parallel edges by entry, exit and offset.

While this encoding describes blocks with two edges, it can also be used for blocks with a single edge. A second edge offset of zero can be assumed to indicate that there is no second edge, that is, a single-edge block (FIG. 16).

Figure 17A:
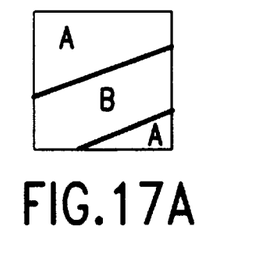
FIG. 17A–B show an embodiment wherein two edges can separate two or three colors.
Figure 17B:
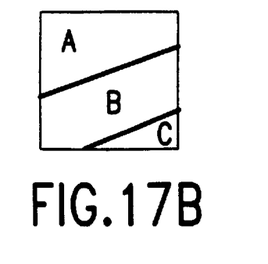

Two edges can separate either two colors or three colors (see FIGS. 17A–B). The color table index might be used with either a two-color or three-color table. An additional bit can be used to indicate which color table should be used.

Figure 18:
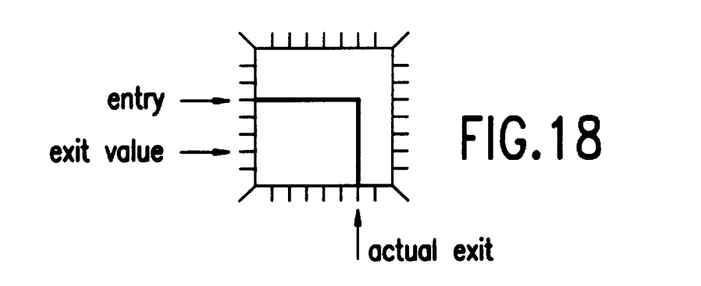
FIG. 18 shows the operation of defining a corner in graphics encoding.

The encoding for edges specifies both entry and exit position for one of the edges. It allows the specification of the same side of the block for both entrance and exit. This is, of course, impossible, so there are a number of specifications that cannot be drawn. To take full advantage of the encoding, these specifications can be used to describe another commonly occurring case, a right-angle corner formed from horizontal and vertical edges. The entry position can specify the entry of the corner. An exit position on the same side as the entry can be interpreted as an exit of a corner on the next side (counterclockwise) (see FIG. 18).

Figure 19:
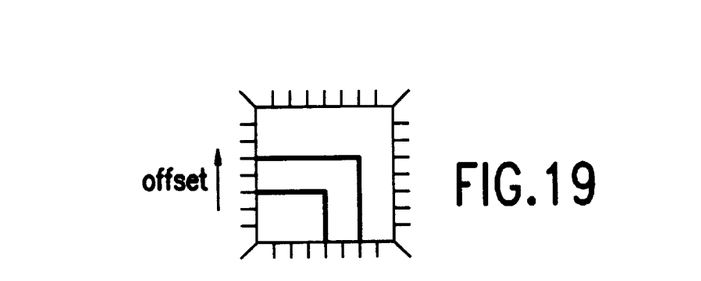
FIG. 19 illustrates a stroke corner in graphics encoding.

The parallel edge offset value can be used with the corner specification to describe a right-angle joint in a stroke (FIG. 19).

Figure 20:
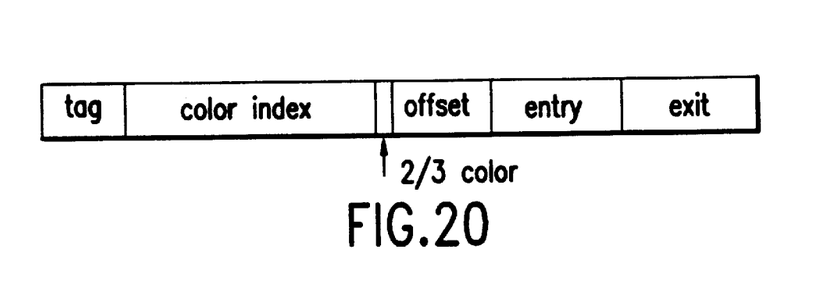
FIG. 20 illustrates two edge encoding.

A picture of the two-edge encoding word is shown in FIG. 20. The two-edge encoding describes the entry and exit positions of the edges to within ⅛ of a block. This matches the resolution needed for the doubled resolution where each block becomes an 8×8 array of pixels. The edges can be drawn with patterns that give smooth steps and avoid jagged edges. Horizontal and vertical edges can be positioned to the full accuracy of the device (rather than the half resolution of the image buffer).

The two-edge encoding only works for edges that both enter and exit the block. If an edge terminates within the block then one of the other encodings (two-color or three-color) must be used.

Text

The sharp clean edges of high quality text require the full resolution of the device. Using two-color blocks and doubling (with smoothing) may cause the loss of fine serifs or may give errors where strokes meet. The graphical two-edge encoding is also inadequate since the characters will often generate blocks with more than two edges, or edges that are not parallel. To handle text, the full resolution bitmap for the character is required. It is possible to do this because the actual bitmap need not be placed in the image buffer. Instead, a pointer or reference to the bitmap can be placed in the image buffer, and the actual bitmap can be saved in a font cache. This way, a single bitmap determining a character shape can be used for all instances of that character.

Figure 21:
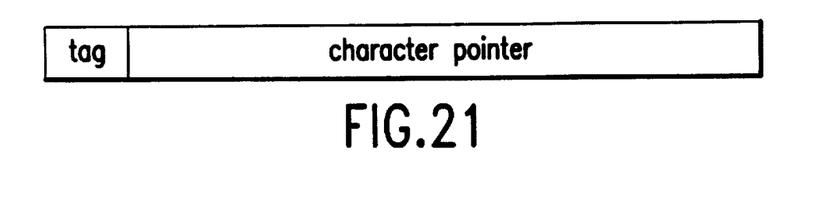
FIG. 21 shows black and white text encoding.

In order to position the character arbitrarily within the block, the pointer should address the bitmap down to the bit. A 24-bit pointer would be sufficient to reference a 2 MByte font cache. However, it would be impossible to squeeze a 24-bit pointer, tag and reasonable color-table index into a single 32-bit word. If the colors are taken to be black text on a white background, then the color table index is not needed, and a single word is adequate (FIG. 21).

Figure 22:
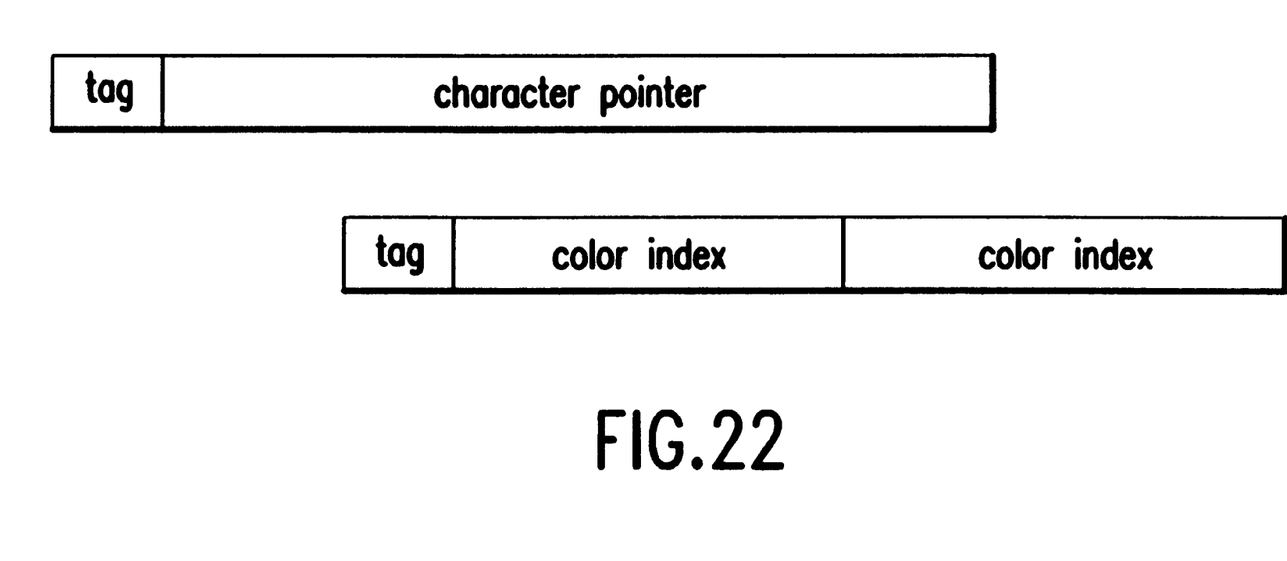
FIG. 22 illustrates colored text encoding.

If, however, either the text or background are colored, then the colors must be specified (as by a color table index), and this can be done by using a pair of consecutive blocks to specify a complete character reference. This is a viable approach because character bitmaps will almost always cover more than two pixel blocks. The first word can provide the pointer to the character bitmap, and the second word can provide the color indices for both blocks (FIG. 22).

Figure 23:
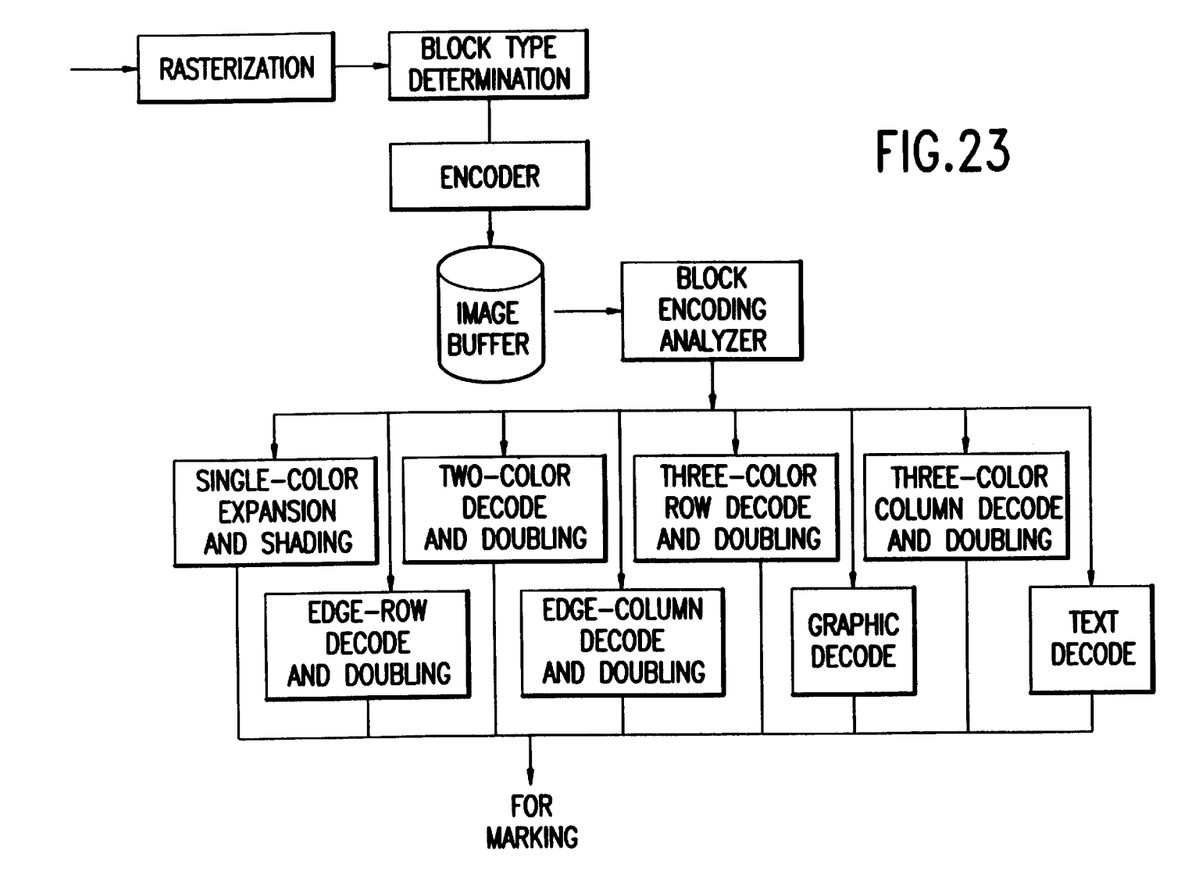
FIG. 23 is a schematic illustration of the apparatus of the present invention.

FIG. 23 is a schematic illustration of the apparatus of the present invention. After rasterization of the image, it is determined which of the block types described above is being encoded, and encoding is performed. The encoded block is stored in the image buffer. For marking, the stored blocks are decoded and/or doubled using the above-described methods in accordance with the block type determination.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. A method for decoding and scaling an image, the method comprising the steps of:
   providing at least one first pixel block representation representing a first pixel area in the image that has been encoded by a first encoding method;
   providing at least one second pixel block representation representing a second pixel area in the image that has been encoded by a second encoding method, the first pixel area being exclusive of the second pixel area, the first encoding method being different from the second encoding method, all of the at least one first and second pixel blocks being at a reduced resolution;
   decoding the at least one first pixel block representation using a first decoding method corresponding to the first encoding method;
   decoding the at least one second pixel block representation using a second decoding method corresponding to the second encoding method;
   scaling the decoded at least one first pixel block to full resolution using a scaling method corresponding to the first encoding method; and
   scaling the decoded at least one second pixel block to full resolution using a scaling method corresponding to the second encoding method.

2. A method according to claim 1, wherein the pixel block size is 8 by 8 pixels.

3. A method according to claim 1, further comprising the step of filtering said full resolution first pixel block values wherein the filtering method corresponds to the first encoding method.

4. A method according to claim 3, wherein said filtering step comprises the step of calculating the full resolution first pixel block values as a weighted sum of neighboring reduced-resolution pixel block values.

5. A method according to claim 1, wherein said first pixel block contains three independent colors that always occur in the same order in each row, wherein said scaling step comprises the steps of generating bitmaps for at least two of the three independent colors and scaling said bit maps.

6. A method according to claim 1, wherein said first pixel block contains three independent colors that always occur in the same order in each row, said at least one pixel block representation comprising an entry for each row describing an assignment of colors for that row, wherein said scaling step comprises the steps of generating bitmaps for at least two of the three independent colors and scaling said bitmaps.

7. A method according to claim 1, wherein said first pixel block contains three independent colors that always occur in the same order in each column, said at least one first pixel block representation comprising an entry for each column describing an assignment of colors for that column, wherein said scaling step comprises the steps of generating bitmaps for at least two of the three independent colors and scaling said bitmaps.

8. A method according to claim 1, wherein said first pixel block contains an edge between two independent colors, said at least one first pixel block representation comprising entries for each row describing subpixel placement of the edge for that row of the first pixel block, wherein said scaling step comprises the step of using edge placement values to determine which full resolution pixel contains the edge for each of the reduced resolution rows.

9. A method according to claim 1, wherein said first pixel block contains an edge between two independent colors, said scaling step comprising the step of using edge placement values to determine which full resolution pixel contains the edge for each reduced resolution rows.

10. A method according to claim 1, wherein said first pixel block contains an edge between two independent colors, said at least one of the first pixel block representation comprising entries for each reduced resolution row describing subpixel placement of the edge for that row of the first pixel block, wherein said scaling step comprises the step of interpolating edge positions to obtain edge positions for interleaved full-resolution rows.

11. A method according to claim 1, wherein said first pixel block contains an edge between two independent colors, said scaling step comprising the step of interpolating edge positions to obtain edge positions for interleaved full resolution rows.

12. A method according to claim 1, wherein said first pixel block contains an edge between two independent colors, said at least one of first pixel block representation comprising entries for each column describing subpixel placement of the edge for that column of the first pixel block, wherein said scaling step comprises the step of using edge placement values to determine which full resolution pixel contains the edge for each of the reduced resolution columns.

13. A method according to claim 1, wherein said first pixel block contains an edge between two independent colors, said scaling step comprising the step of using edge placement values to determine which full resolution pixel contains the edge for each reduced resolution column.

14. A method according to claim 1, wherein said first pixel block contains an edge between two independent colors, said at least one first pixel block representation comprising entries for each column describing subpixel placement of the edge for that column of the first pixel block, wherein said scaling step comprises the step of interpolating edge positions to obtain edge positions for interleaved full-resolution columns.

15. A method according to claim 1, wherein said first pixel block contains an edge between two independent colors, said scaling step comprising the step of interpolating edge positions to obtain edge positions for interleaved full resolution columns.

16. A method according to claim 1, wherein said first encoding method comprises the steps of storing at least one color value and further comprising the step of scaling the first pixel block representation wherein the scaling step includes linearly interpolating between said at least one color and other colors of neighboring blocks of pixels.

17. A method according to claim 16, wherein the pixel block size is 8 by 8 pixels.

18. A method according to claim 16, further comprising the step of generating a bitmap for each of said at least one color, wherein said bitmap is used in the selection of pixels in the linear interpolating step.

19. A method according to claim 18, further comprising the steps of determining a color value of said one color and said other colors, and placing said revised color at each location indicated by said bitmaps in accordance with said determining step.

20. The method of claim 1, wherein the first pixel block representation includes an identifier of the first encoding method and wherein the second pixel block representation includes an identifier of the second encoding method.

21. An apparatus for decoding and scaling an image, the apparatus comprising:
 a decoder that decodes at least one first pixel block representation using a first decoding method and at least one second pixel block representation using a second decoding method, the at least one first pixel block representation representing a first pixel area in the image and being encoded by a first encoding method, the first decoding method corresponding to the first encoding method and the at least one second pixel block representation representing a second pixel area in the image and being encoded by a second encoding method, the second decoding method corresponding to the second encoding method, the first pixel area being exclusive of the second pixel area and the first encoding method being different from the second encoding method, all of the first and second pixel block representations being at a resolution reduced from the full resolution; and
 a scaler that scales the decoded at least one first pixel block to full resolution using a scaling method corresponding to the first encoding method and the decoded at least one second pixel block to full resolution using a scaling method corresponding to the second encoding method.

22. An apparatus of claim 21, wherein the pixel block size is 8 by 8 pixels.

23. An apparatus according to claim 21, further comprising a filter for filtering said full-resolution first pixel block values in accordance with the first encoding method.

24. An apparatus according to claim 23, wherein said filter is a low-pass filter.

25. An apparatus according to claim 23, wherein said filter is an edge-preserving filter.

26. An apparatus according to claim 23, wherein said filter comprises a processor for calculating the full resolution first pixel block values as a weighted sum of neighboring reduced resolution pixel block values.

27. An apparatus according to claim 21, wherein said scaler comprises a processor for recognizing corner patterns and smoothing said corner patterns at full resolution.

28. An apparatus according to claim 21, wherein said first pixel block contains three independent colors that always occur in the same order in each row, said at least one first pixel representation comprising an entry for each row describing an assignment of colors for that row, wherein said scaler comprises a processor for generating bitmaps for at least two of the three independent colors and for scaling said bitmaps.

29. An apparatus according to claim 21, wherein said first pixel block contains three independent colors that always occur in the same order in each column, said at least one first pixel block representation comprising an entry for each column describing an assignment of colors for that column, wherein said scaler comprises a processor for generating bitmaps for at least two of the three independent colors and for scaling said bitmaps.

30. An apparatus according to claim 21, wherein said first pixel block contains an edge between two independent colors, said at least one first pixel block representation comprising entries for each row describing subpixel placement of the edge for that row of the first pixel block, wherein said scaler comprises a processor for using edge placement values to determine which full resolution pixel contains the edge for each of the reduced resolution rows.

31. An apparatus according to claim 21, wherein said first pixel block contains an edge between two independent colors, said scaler comprising a processor for using edge placement values to determine which full resolution pixel contains the edge for each reduced resolution row.

32. An apparatus according to claim 21, wherein said first pixel block contains an edge between two independent colors, said at least one first pixel block representation comprising entries for each row describing subpixel placement of the edge for that row of the first pixel block, wherein said scaler comprises a processor for interpolating edge positions to obtain edge positions for interleaved full-resolution rows.

33. An apparatus according to claim 21, wherein said first pixel block contains an edge between two independent colors, said scaler comprising a processor for interpolating edge positions to obtain edge positions for interleaved full resolution rows.

34. An apparatus according to claim 20, wherein said first pixel block contains an edge between two independent colors, said at least one first pixel block representation comprising entries for each column describing subpixel placement of the edge for that column of the first pixel block, wherein said scaler comprises a processor for using edge placement values to determine which full resolution pixel contains the edge for each reduced resolution column.

35. An apparatus according to claim 21, wherein said first pixel block contains an edge between two independent colors, said scaler comprising a processor for using edge placement values to determine which full resolution pixel contains the edge for each reduced resolution column.

36. An apparatus according to claim 21, wherein said first pixel block contains an edge between two independent colors, said at least one first pixel block representation comprising entries for each column describing subpixel placement of the edge for that column of the first pixel block, wherein said scaler comprises a processor for interpolating edge positions to obtain edge positions for interleaved full-resolution columns.

37. An apparatus according to claim 21, wherein said first pixel block contains an edge between two independent colors, said scaler comprising a processor for interpolating edge positions to obtain edge positions for interleaved full resolution columns.

38. An apparatus according to claim 21, comprising an encoder for encoding image regions of varying color including a storage device for storing at least one color value and wherein the scaler also scales the first pixel block representation and linearly interpolates between said at least one color and other colors of neighboring blocks of pixels.

39. An apparatus according to claim 38, wherein the pixel block size is 8 by 8 pixels.

40. An apparatus according to claim 38, further comprising a bitmap generator for generating a bitmap for each of said at least one color, wherein said bitmap is used in the selection of pixels by the scaler when linearly interpolating.

41. An apparatus according to claim 40, wherein the processor also determines a color value of said one color and said other colors, and places said revised color at each location indicated by said bitmaps.

42. The apparatus of claim 21, wherein the first pixel block representation includes an identifier of the first encoding method and wherein the second pixel block representation includes an identifier of the second encoding method.

* * * * *